3,344,676
WINDINGLESS GYRO FLOAT
Argyle G. Lautzenhiser, Gloucester, and Harold E. Clark, Middleton, Mass., assignors to General Motors Corporation, Detroit, Mich., a corporation of Delaware
Filed Dec. 7, 1964, Ser. No. 416,450
5 Claims. (Cl. 74—5.7)

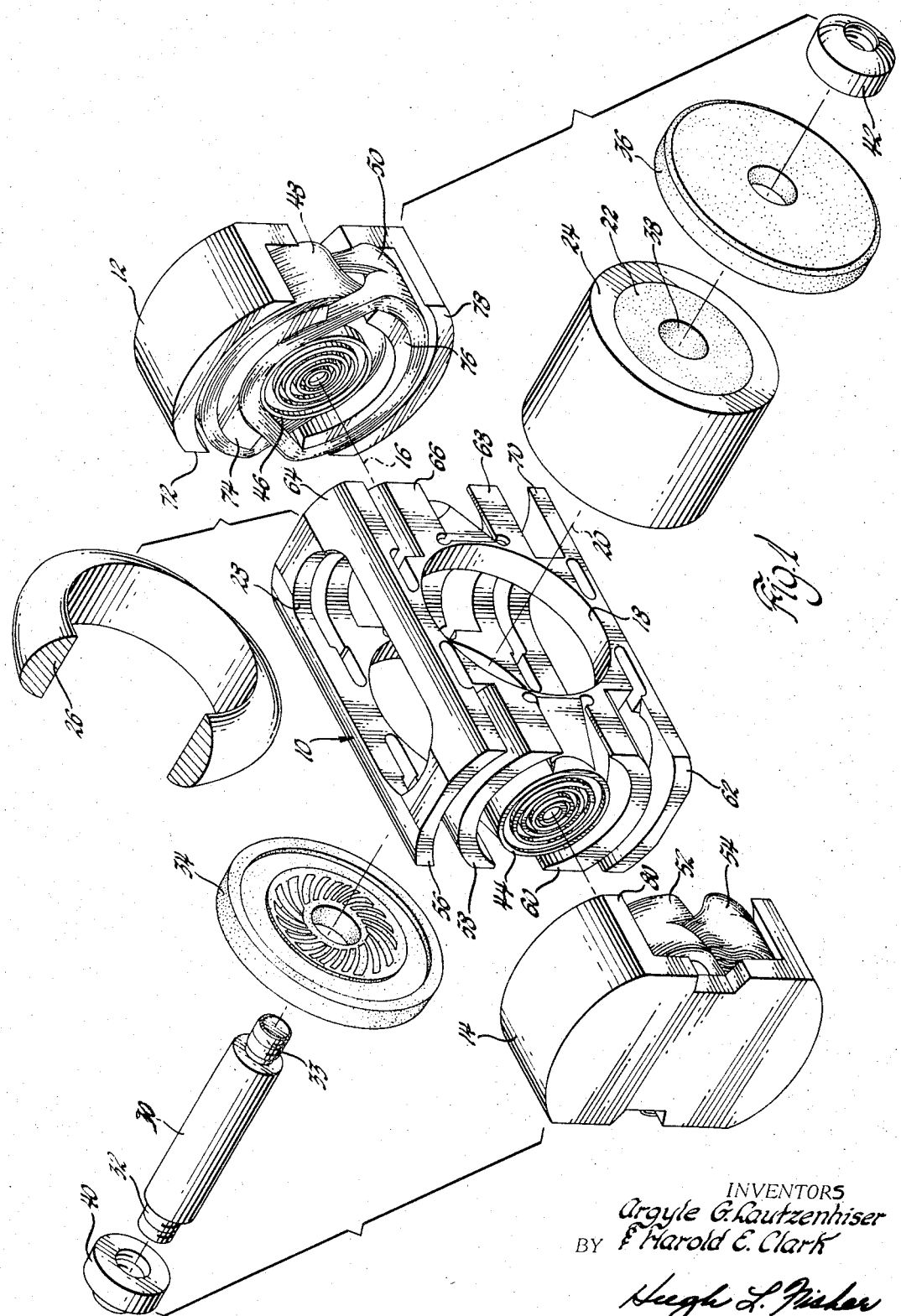

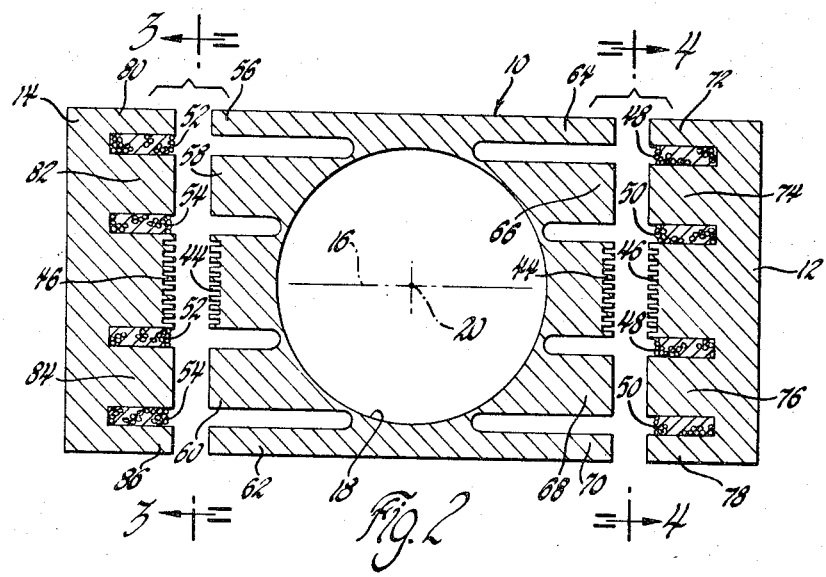
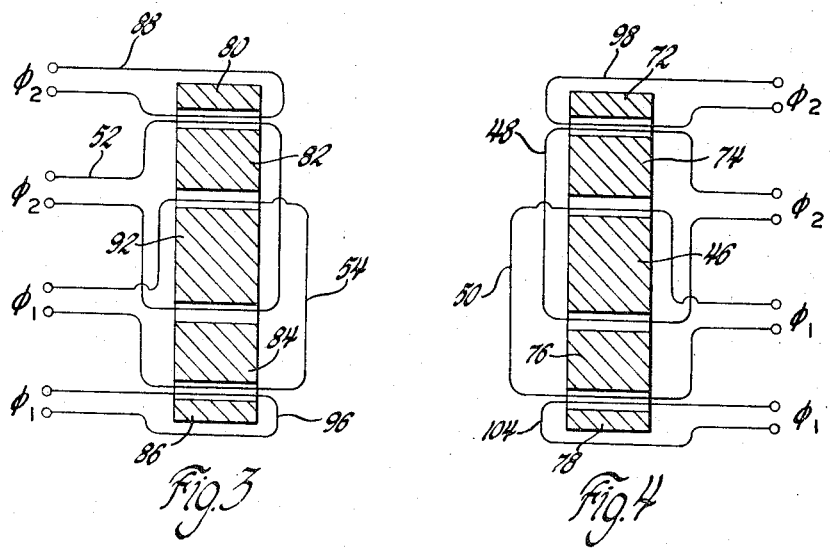
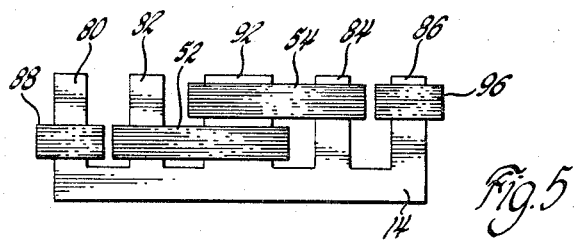
INVENTORS
Argyle G. Lautzenhiser
& Harold E. Clark
Hugh L. Fisher
ATTORNEY United States Patent Office 3,344,676
Patented Oct. 3, 1967

This invention relates to float carried motor apparatus of the type employed in gyroscopes for rotor drive purposes and more particularly to a combined magnetic suspension and power conveyance system for a float carried motor which eliminates the need for windings and leads on the float body.

Inertial guidance systems require, for accurate navigation capabilities, the use of components which are as error free as possible. Gyros used in such systems are necessarily intricate and precisely constructed instruments. Nevertheless, there are certain sources of error in gyros which can degrade system accuracy. One source of error resides in the means employed to suspend the gyro rotor float. Another source of error resides in the means for conveying power to the gyro motor, such as float carried windings which are subject to shifting due to thermal expansion, and associated leads which are also subject to shifting. A float suspension which is designed to reduce or eliminate the first-mentioned source of error is shown in United States Patent No. 3,146,038 to Argyle G. Lautzenhiser, issued Aug. 25, 1964. In this suspension system, a body such as a gyro float is supported between endwise disposed stationary members by magnetic flux which extends between a set of concentric annular rings on each of the stationary members and similar sets of rings on the float. This system provides triaxial stability without the use of physically contacting bearings between the stationary members and the float.

A combination float suspension and power conveyance system which reduces the second-mentioned source of error by eliminating the flexible leads between the housing mounted stationary members and the float, as well as eliminating physically contacting bearings, is shown in United States Ser. No. 345,439, filed Feb. 17, 1964, in the name of Robert F. Wolf. In that copending application, a magnetic suspension system is employed which also conveys power to the float carried motor by transformer action.

In accordance with the present invention, the conveyance of power to a float carried rotary motor is provided without the need for windings or leads of any type on the float body. Thus, errors arising from mass shift of secondary windings and leads are eliminated. In general this is accomplished by means of corresponding pole structures on both the float body and the stationary member adjacent thereto through which a moving magnetic flux field generated in the stationary member is applied directly across the motor gap.

In a preferred embodiment of the invention, means are provided to magnetically suspend the float body out of physical contact with the surrounding stationary members. This means functions to suspend the float body in a cooperative relationship with the power conveying pole structures as defined above such that all physical connection between the stationary structure and the float is eliminated as well as the secondary windings and leads on the float structure. In general this is accomplished by the provision of sets of concentric annular rings on each of a pair of stationary structures which are disposed at opposite axial ends of the float, and similar sets of rings on the float which, when energized by the motor field generated windings on the stationary structures, provide magnetic forces tending to suspend the float in a reference position between the stationary members.

Thus it can be seen that, in accordance with the present invention, a motor carrying float such as may be used in a gyroscope is provided, which float is suspended free from physical contact with the surrounding structure and further free from any secondary windings or power leads required to drive the rotor motor, and therefore, all errors arising from these sources are correspondingly eliminated. These and other advantages of the invention may be best understood by reference to the following description of an illustrative embodiment thereof. This description is to be taken with the accompanying figures of which:

FIGURE 1 is an exploded view of a single degree of freedom gyro constructed in accordance with the present invention;

FIGURE 2 is a simplified cross-sectional view of a portion of the float and stationary structures of the embodiment shown in FIGURE 1;

FIGURE 3 is a cross-sectional view of one of the stationary members indicating the nature of a preferred wiring arrangement to provide a moving magnetic field;

FIGURE 4 is a cross-sectional view of the other stationary member indicating the nature of the wiring thereon; and FIGURE 5 is a plan view of one of the stationary members showing the disposition of windings on the pole structures thereof.

In the specific embodiment described herein, a magnetically suspended gyro float body carries a rotor which is supported for rotation about a rotor axis by means of a hydrodynamic fluid bearing and which is driven by a hysteresis motor.

Referring specifically to the drawings, FIGURE 1 shows the embodiment to include a float 10 of generally rectangular shape which is constructed of a magnetic material such as ferrite. The float 10 is, as further explained in the the following, magnetically suspended between two stator members 12 and 14 which are disposed on opposite ends of the float 10 along a support axis 16. The float 10 is substantially hollow having a central bore 18 which extends through the float 10 along a rotor axis 20 which is perpendicular to the support axis 16. By means of the central bore 18, a cylindrical gyro rotor 22 of ceramic construction may be disposed within the central opening of the float 10 along with a cylindrical ferrite hysteresis ring 24 which is mounted on the outer surface of the rotor 22. In addition, a heavy inertia rim 26 may be mounted on the outer surface of the hysteresis ring 24 to increase the inertia and thus the stability of the rotor 22. The inertia rim 26 may be placed within the central opening of the float 10 by means of a top opening 28 in the float.

The rotor assembly 22, 24, 26 is shown to be supported for rotation about the axis 20 within the interior of the float 10 by means of a hydrodynamic fluid bearing comprising a journal 30 of generally cylindrical configuration and having threaded end portions 32 and 33, and a pair of thrust pads 34 and 36. The hydrodynamic bearing is assembled such that the journal portion 30 extends through a central bore 38 in the rotor 22, thrust pad 34 is placed axially adjacent the rotor 22 to the left, as shown in the drawing, thrust pad 36 is placed adjacent the right side of rotor 22, as shown in the drawing, and securing nuts 40 and 42 are threaded onto the threaded portions 32 of the journal 30 to maintain the whole assembly in a rigid relationship. The entire journal and thrust pad assembly is secured to external support means connected with the ferrite float 10 but omitted from the drawing for the sake of clarity.

Describing the support system for the apparatus shown in FIGURES 1 and 2 in detail, the float 10 is provided on each end thereof along the support axis 16 with a set of concentric annular rings 44 which project axially along axis 16 and are coaxial therewith. These rings 44 are defined by a plurality of parallel and coaxial slots formed in the float 10. Similarly, each of the ferromagnetic stators 12 and 14 is provided with a corresponding set of concentric and axially extending rings 46 as shown, for example, on stator 12. As described in the aforementioned Patent No. 3,146,038 to Lautzenhiser, these cooperating sets of concentric rings, when energized with flux which flows between the sets, act as combined radial and thrust bearings to maintain the float 10 centered between and coaxial with the stators 12 and 14 while permitting rotary displacement about axis 16. The flux for this magnetic suspension is provided by sets of windings 48 and 50 on stator 12 and 52 and 54 on stator 14. These windings may be wound on the stator and connected to a voltage source as further described in the following.

Describing the motor power conveying means, the ferrite float 10 is also provided on opposite sides of the central bore 18 with a plurality of parallel arcuate pole pieces which extend outwardly in opposite directions along axis 16 and are coaxial therewith. The pole pieces on the left-hand side of the float as seen in the drawing are designated as 56, 58, 60 and 62. The poles on the right-hand portion of the float as seen in the drawing are designated 64, 66, 68 and 70. These pole pieces are separately defined by axially extending and radially spaced slots which extend from the axial ends of the float inwardly toward the central opening thereof such that the axially extending pole pieces communicate with circumferentially spaced portions of the interior of the float 10.

In a similar fashion, each of the stators 12 and 14 is also constructed so as to have a plurality of axially extending parallel and arcuate pole pieces about the support axis 16. Stator 12 is provided with pole pieces 72 and 78 at one radial distance from axis 16 and pole pieces 74 and 76 at a second radial distance. Similarly, stator 14 is provided with pole pieces 80, 82, 84 and 86, as best seen in FIGURE 2. These pole pieces are defined by parallel arcuate slots which extend partially through the stators 12 and 14 along axis 16 as shown in FIGURE 2. The windings 48 and 50 and windings 52 and 54 are disposed within the slots in the stators 12 and 14 interjacent the pole pieces.

As shown in FIGURE 2, the stator windings 52 and 54 of stator 14 when energized produce flux traversing the pole pieces 80, 82, 84 and 86. This flux travels axially along the pole pieces and extends across the gap between stator 14 and float 10 to the pole pieces 56, 58, 60 and 62 of the float 10. The configuration of the pole pieces of the float 10 is such that the flux is communicated to respective points which are circumferentially spaced about the central opening in the float 10, as indicated by the central bore 18 in FIGURE 2. Accordingly, if the windings on the stator 14 are properly phased, a rotating magnetic field may be produced about the interior of the float 10 which acts upon the hysteresis ring 24 of the rotor 22 to produce a force tending to rotate the rotor 22 about the rotor axis 20. A similar analysis applies to the combination of windings and pole pieces in the stator 12 and the right-hand side of float 10, as shown in FIGURE 2.

To provide such a rotating magnetic field, a winding configuration, such as shown in FIGURES 3 and 4, may be employed. As shown in FIGURES 1 and 3, winding 52 links pole pieces 82 and ringed portion 92 while winding 54 links 92 and pole piece 84. Additional windings 88 and 96 link pole pieces 80 and 86 to provide additional flux as optionally shown in FIGURE 3. As indicated in FIGURE 3, windings 54 and 96 may be connected to the first phase of a two-phase power supply while windings 88 and 52 are connected to the second phase of a two phase power supply. In a similar fashion, the right-hand stator member 12, as viewed in FIGURE 2, is provided with a set of four windings of which winding 98 encloses pole piece 72, winding 48 encloses pole piece 74 and the ring portion 46, winding 50 encloses ring portion 46 and pole piece 76, while winding 104 encloses only pole piece 78. Windings 50 and 104 are connected to the first phase of the two-phase power supply while windings 98 and 48 are connected to the second phase. The windings which are disposed on the left-hand stator 14 may be axially located according to the plan shown in FIGURE 5. The windings on the right-hand stator 12 may be similarly disposed.

Describing the operation of the specific embodiment shown in the figures, the windings located on the stators 12 and 14 are energized by a two-phase power supply according to the scheme suggested in FIGURES 3, 4 and 5. Energization of the windings produces magnetic flux between the concentric rings 44 on opposite ends of the float 10 and the corresponding sets of concentric rings 46 on the stators 12 and 14. The float 10 thus prefers to maintain a position which is centered between the concentric rings of the stators 12 and 14. Any displacement along axis 16 tends to widen one of the gaps between the stators and float 10 and narrow the other gaps corresponding. Thus, through external circuitry (not shown) forces are developed tending to recenter the float 10 between the stators 12 and 14. Any radial displacement of float 10 with respect to axis 16 tends to bend the flux lines between the corresponding float and stator concentric rings thus creating a longer and correspondingly higher reluctance flux path which is resisted by forces tending to return the float 10 to position of axial alignment. Thus, radial and axial supporting forces to magnetically suspend float 10 between stators 12 and 14 are provided. In addition, with the two-phase power supply connected to the windings of the stators 12 and 14, a moving magnetic flux field is provided across the pole pieces which, because of the communication of the pole pieces of the float 10 with circumferentially spaced positions about the interior of the float 10, produces a rotating magnetic field in the motor gap which is established between the interior of float 10 and the ferrite hysteresis ring 24 of the rotor 22. This rotating magnetic field tends to rotate hysteresis ring 24 in the manner of a conventional two-phase four-pole hysteresis motor. Rotation of rotor 22 relative to the journal 30 and thrust pads 34 and 36 produces hydrodynamic supporting forces which radially and axially support rotor 22 within the float 10.

The specific embodiment illustrated and described herein is not to be construed in a limiting sense. For a definition of the invention, reference should be had to the appended claims.

We claim:

1. Gyro apparatus including a hollow float member of magnetic material and having a support axis and a rotor axis perpendicular to the support axis, rotor means disposed within the flat member and supported for rotation about the rotor axis, a hysteresis ring mounted on the rotor means is radially spaced relation with the float member, a pair of stator members disposed adjacent but spaced from opposite ends of the float member along the support axis, a plurality of pole pieces formed on said opposite ends of the float member, the pole pieces being radially spaced outwardly from the support axis and extending therealong and communicative with the rotor means at circumferentially spaced points therearound, corresponding pole pieces formed on said stator members, winding means disposed on the stator members for energizing the pole pieces to produce a magnetic field which rotates about the rotor means tending to torque the hysteresis ring about the rotor axis, and magnetic means for supporting the float member between the stator members.

2. Magnetically suspended motor apparatus including: A float body of magnetic material having a central opening along a first axis thereof, a plurality of parallel arcuate slots formed in the body at each of opposite ends extending along and centered about a second axis perpendicular to the first axis thereby to define a plurality of poles communicative with the circumferentially spaced portions of the body about the central opening, rotor means disposed within the central opening and supported on the body for rotation about the first axis, a hysteresis ring mounted on the rotor in radially spaced relation with the poles, a pair of stator members of magnetic material disposed adjacent said opposite ends of the body and spaced therefrom, each of the stator members having formed therein a plurality of parallel arcuate slots extending along and centered about the second axis to define a plurality of poles corresponding to poles of the body, polyphase winding means disposed in the stator slots for producing flux between the corresponding poles of the body and the stator members, and magnetic means energizable by said winding means for producing combined axial and radial suspending forces for maintaining the body centered between the stator members.

3. Magnetically suspended motor apparatus including a float body of ferromagnetic material having a central opening along a first axis thereof, the body having formed at each of opposite ends thereof along a second axis orthogonal to the first axis, a plurality of arcuate slots defining pole pieces about the second axis and communicative with circumferentially spaced portions of the body about the central opening, the body also having formed at each of said ends a plurality of concentric circular slots defining support rings coaxial with said poles, a rotor disposed within the central opening and supported on the body for rotation about the first axis, a hysteresis ring mounted on the rotor in radially spaced relation with the poles and responsive to a field produced by the poles to be rotated therewith, a pair of stator members disposed at opposite ends of the body along the second axis and spaced therefrom, each of the stator members having formed therein a plurality of axially extending arcuate slots defining poles corresponding to the poles of the body, and a plurality of concentric circular slots defining support rings coaxial with the poles and corresponding with the rings of the body, a plurality of windings disposed in the stator member slots for producing, when energized, flux between the poles and rings of the stator members and the body, and a polyphase voltage source connected to the windings thereby to produce supporting forces for the float between the stator members and a rotating magnetic field between said poles and the rotor.

4. Gyro apparatus comprising, a ferromagnetic float body having a central opening along a first axis thereof, and a plurality of parallel arcuate pole pieces extending along and radially spaced about a second axis perpendicular to the first axis, the respctive pole pieces thereby communicating with the central opening at circumferentially spaced points thereabout, rotor means disposed in the opening and supported for rotation about the first axis, the rotor means including a hysteresis ring spaced from the interior of the float body and adjacent said spaced points, a pair of stator members of ferromagnetic material disposed adjacent but spaced from opposite ends of the float body along the second axis, the surfaces of the stator members adjacent the float member having formed therein a plurality of parallel arcuate pole pieces extending along and radially spaced about the second axis and coinciding with the pole pieces of the float body, at least two windings disposed on each of the stator members interjacent the pole pieces and energizable to produce flux between respective stator and float body pole pieces, thereby to produce a magnetic field which effectively rotates about the central opening, magnetic support means for suspending the float body between the stator members including a plurality of concentric rings at each end of the float member coaxial with the second axis and extending therealong, and corresponding concentric rings formed on the stator members about the second axis whereby energization of the windings produces flux between the rings tending to maintain the float body in a reference position relative to the stator members.

5. In gyro apparatus, a hollow float member of magnetic material and having a support axis and a rotor axis perpendicular to the support axis, rotor means disposed within the float member and supported for rotation about the rotor axis, the rotor means including means responsive to a rotating magnetic field to be rotated therewith, a plurality of parallel, arcuate and radially spaced slots formed in the float member extending along the support axis to define a plurality of pole pieces communicative with circumferentially spaced portions of the rotor means, means for supporting the float member in a predetermined position, and means for producing phase shifting moving flux fields in the pole pieces thereby to produce a rotating magnetic field about the rotor means.

No references cited.

FRED C. MATTERN JR., *Primary Examiner.*

J. D. PUFFER, C. J. HUSAR, *Assistant Examiners.*